United States Patent [19]

Komagine

[11] Patent Number: 5,479,585
[45] Date of Patent: Dec. 26, 1995

[54] METHOD OF CARRYING A SHEET MEMBER FOR PLOTTER AND DEVICE THEREFOR

[75] Inventor: Tukuru Komagine, Tokyo, Japan

[73] Assignee: Mutoh Industries, Ltd., Tokyo, Japan

[21] Appl. No.: 960,709

[22] Filed: Oct. 14, 1992

[30] Foreign Application Priority Data

Nov. 26, 1991 [JP] Japan .................... 3-336171

[51] Int. Cl.⁶ .................................... G06K 15/00
[52] U.S. Cl. ............................ 395/103; 101/137
[58] Field of Search .................... 395/103, 104, 395/111, 101; 101/40, 40.1, 43, 44, 53, 227, 228, 231, 232, 401, 407.1–411, 415, DIG. 48, 137; 271/6, 7, 34, 85, 268, 278

[56] References Cited

U.S. PATENT DOCUMENTS

| | | | |
|---|---|---|---|
| 4,632,377 | 12/1986 | Browse | 271/9 |
| 5,110,113 | 5/1992 | Kanaya | 271/241 |
| 5,193,458 | 3/1993 | Keller | 101/137 |

*Primary Examiner*—Raymond J. Bayerl
*Assistant Examiner*—Tracy M. Legree
*Attorney, Agent, or Firm*—Sughrue, Mion, Zinn, Macpeak & Seas; Richard C. Turner; Joseph J. Buczynski

[57] ABSTRACT

A method and apparatus for transferring a sheet by a belt drive in a plotter, so that the position of a transfer rail, on which grip devices which grip the sheet are disposed, does not shift during such transfer. The plotter includes a sheet support surface, an endless carrying belt for moving the sheet support surface, and the transfer rail supported over the sheet support surface. The transfer rail can shift in the direction of movement of the belt, and includes a drawing line head for drawing on or cutting the sheet. The transfer rail further includes two sets of grips, one for gripping the belt, and one for gripping the belt and sheet supported on the sheet support surface. Both sets of grips are adjustable according to the width of the sheet. The sets of grips, when gripping the belt and sheet, enable the sheet, sheet support surface, and transfer rail to move collectively in the direction of movement of the belt.

2 Claims, 3 Drawing Sheets

METHOD OF CARRYING A SHEET MEMBER FOR PLOTTER AND DEVICE THEREFOR

DESCRIPTION OF THE PRIOR ART

Conventional methods of carrying a sheet member for plotter and device therefor of this kind are disclosed in Japanese Patent Publication No. Sho 60-36900. An example of the method of carrying a sheet member for plotter and the device therefor is shown in FIG. 4. In the conventional method of carrying a sheet member for plotter and the device therefor, a set of grips 10 and 12 are provided on a transfer rail 4, and a sheet 8 and a belt 2 are fixed by the set of grips 10 and 12. The movement of the sheet 8 is done by shifting the transfer rail 4 with the drive of the belt 2.

Summary of the Invention

This invention relates to a method of carrying a sheet member for a plotter and the device therefor.

As shown in FIG. 4, in the method of carrying a sheet by disposing a sheet 8 at only one side of the drawing region, grips 10 and 12 approach one side of the transfer rail 4. When the sheet is carried, since the transfer rail 4 also is transferred by the belt 2 that is driven by a motor 6, a load occurs inverse to the transfer direction of the transfer rail 4 by the action of torsion stress in an arrow direction at the side (upper side in FIG. 4) where the grip of the transfer rail 4 does not exist. Hence, there is a possibility of shifting of the grip position against the sheet 8. Particularly, in the case where a heavy unit such as a drawing head 14 was positioned at the upper side in FIG. 4 of the transfer rail 4, there was a large possibility that a shift would occur.

In carrying a sheet by a belt drive, an object of this invention is to prevent the shift of the grip position of the grip provided on the transfer rail against the sheet.

In order to achieve the foregoing object, this invention is constructed to provide a sheet support surface, an endless carrying belt capable of moving the sheet support surface supported on the transfer rail to be movable in a direction of movement of the sheet support surface. A drawing line head 48 for drawing or cutting is provided on the transfer rail. Furthermore, two sets of grips for the belt and the sheet are provided on the transfer rail. The grip for the sheet is evenly adjustable according to the width of the sheet on the sheet support surface. Both end portions of the belt are held by the grip for the belt, and the sheet is held by the grip for the sheet together with the belt. The sheet is carried together with the transfer rail in a predetermined direction on the sheet support surface, by the predetermined speed of the belt.

This invention does not cause the torsion action against the transfer rail at the time of carrying the sheet, since the belt is gripped at both ends of the transfer rail. In this way, shifting of the grip position for holding the sheets together is prevented.

DETAILED DESCRIPTION OF THE PREFERRED EMBODIMENT

Figure 1:
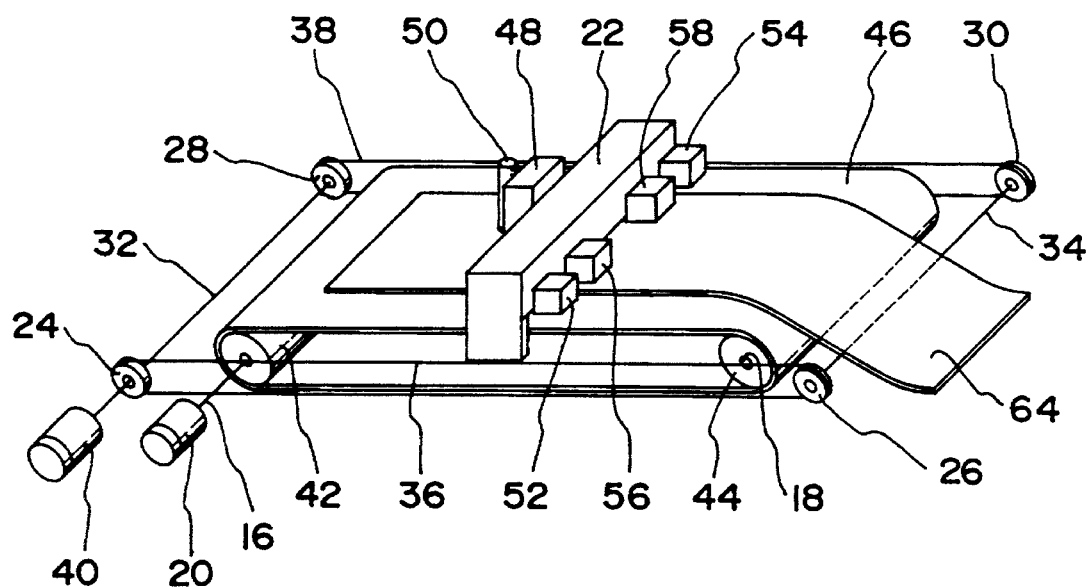
FIG. 1 is an explanatory view of a diagram of a plotter according to this invention.
Figure 2:
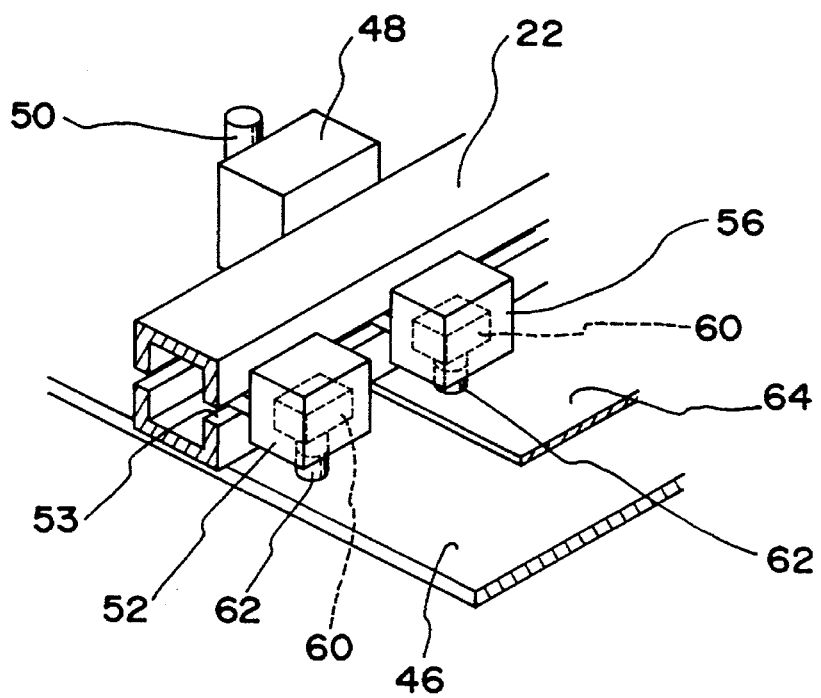
FIG. 2 is an explanatory view of a diagram of an essential part of the plotter according to this invention.

The construction of this invention will be described in detail in the following by referring to an embodiment shown on the attached drawings.

Reference numerals 16 and 18 denote a rotary shaft rotatably supported on the machine (not shown) of a plotter, and one rotary shaft 16 is connected to the output shaft of a belt drive motor 20 fixed to the machine. Reference numeral 22 denotes a transfer rail of the plotter with both ends shiftably supported on a pair of mutually parallel X rails (not shown) which are fixed to the machine. Pulleys 24, 26, 28 and 30 are rotatably supported at both ends of the X rail. The pulleys 24 and 28 are connected by a connecting shaft 32 and the pulleys 26 and 30 are connected by a connecting shaft 34. Between the pulley 24 and 26 and between the pulleys 28 and 30, endless wires 36 and 38 are spanned. The wires 36 and 38 are connected to both ends of the transfer rail 22. The transfer rail 22 is constructed to shift parallel in an X-axis direction along the X rail.

Rollers 42 and 44 are fixed to the rotary shafts 16 and 18, parallel to the transfer rail 22 and the rollers 42 and 44 are rotatably supported on the machine. Between the rollers 42 and 44, a wide endless carrying belt 46 is spanned with proper tension. Numerous small holes for ventilation are perforated on the belt 46. In the lower part of an upper level horizontal portion of the carrying belt 46, a vacuum table (not shown) is fixed to the machine. The transfer rail 22 is mounted with a head 48 to be shiftable along the transfer rail 22. The head 48 is constructed to move along the transfer rail 22 by the power of a Y motor (not shown). The pen holder of the head 48 holds a writing instrument 50 or a cutter, and is connected to a lifting drive device (not shown) built into the head 48. At both ends of the transfer rail 22, a pair of grips 52 and 54, for the belt, are fixed slidably along a rail groove 53.

Reference numerals 56 and 58 denote grips for sheets mounted slidably in the rail groove 53 of the transfer rail 22, and are placed inside between the grips 52 and 54 for the belt. The grips 52, 54, 56 and 58 include a holder, a solenoid 60, placed inside the holder, and a pressure member 62, having a tip pin connected to the output shaft of the solenoid 60. When the solenoid 60 is driven, the pressure member 62 descends, and the tip pin pierces the belt 46 directly through a sheet member 64 on the belt 46 to be engaged with the belt 46 or the belt 46 and the sheet member 64. Regarding the construction of the grips 52, 54, 56 and 58, a variety of structures are known to the art, and this invention is not limited particularly to the piercing structure illustrated herein. A supply roll is rotatably placed on the body of the plotter which is in parallel to the roller 44, and the sheet member 64 is wound on the supply roll.

Next, the operation of an embodiment of this invention will be described.

Firstly, the sheet member 64 to be drawn or cut is drawn on the carrying belt 46. The suction power on the sheet support surface of a vacuum table exerts on the sheet member 64 through numerous small holes of the carrying belt 46, and fixes the sheet member 64 on the sheet support surface of the vacuum table by the suction of air. At the same time, the positions of the grips 56 and 58 for the sheet are adjusted against the transfer rail 22 so that the grips 56 and 58 for the sheet are positioned at both ends of the sheet member 64 in the crosswise direction. The drawing or the cutting is carried out by the movement of the head 48 in an X-Y direction against the sheet member 64 fixed on the sheet support surface of the vacuum table. During the drawing or the cutting, each solenoid 60 of grips 52, 54, 56 and 58 is in non-energized condition, and each pin presses against the belt 46 or the sheet material 64.

Figure 3:
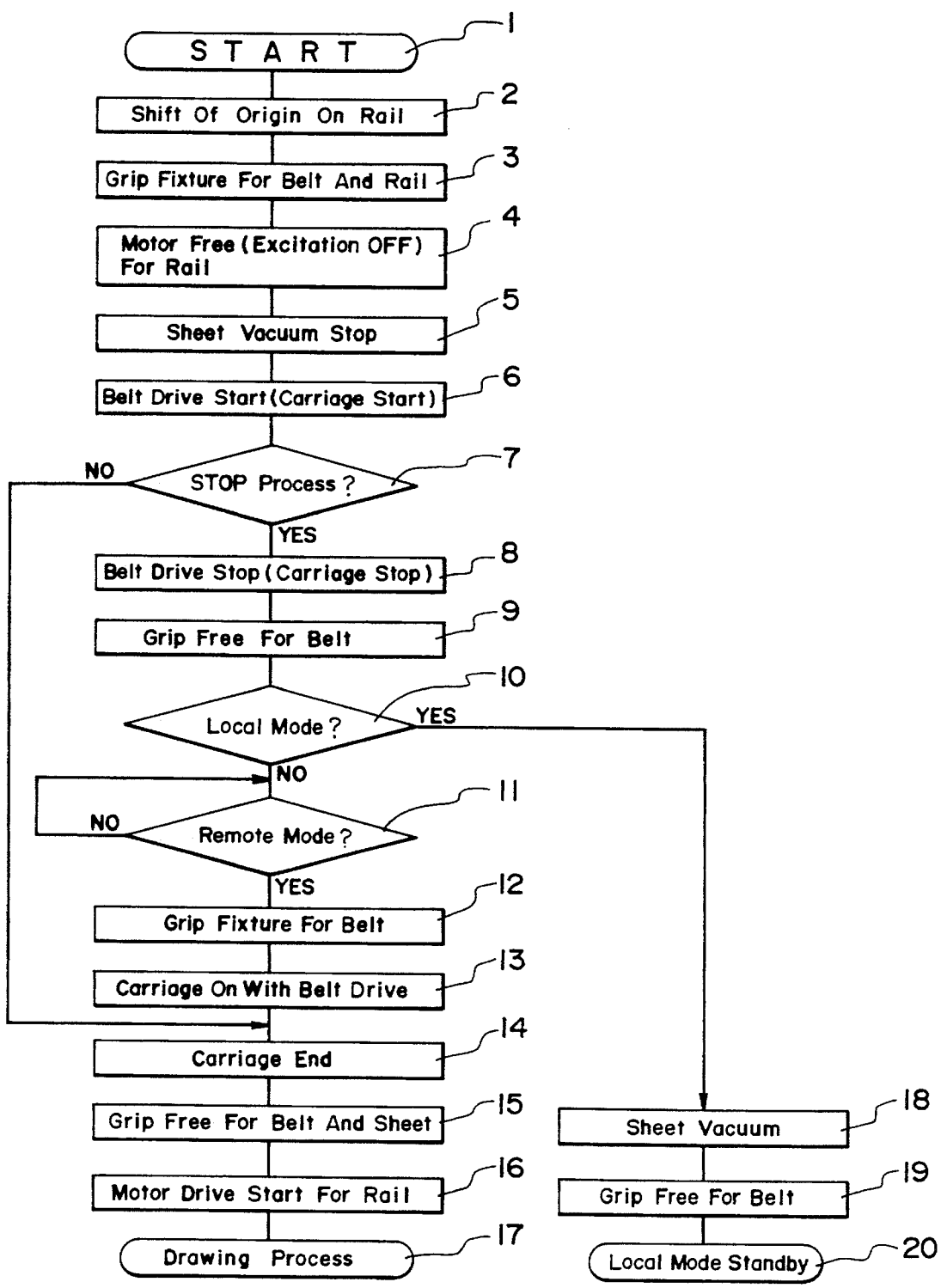
FIG. 3 is a flow chart showing an operation of the plotter according to this invention.
Figure 4:
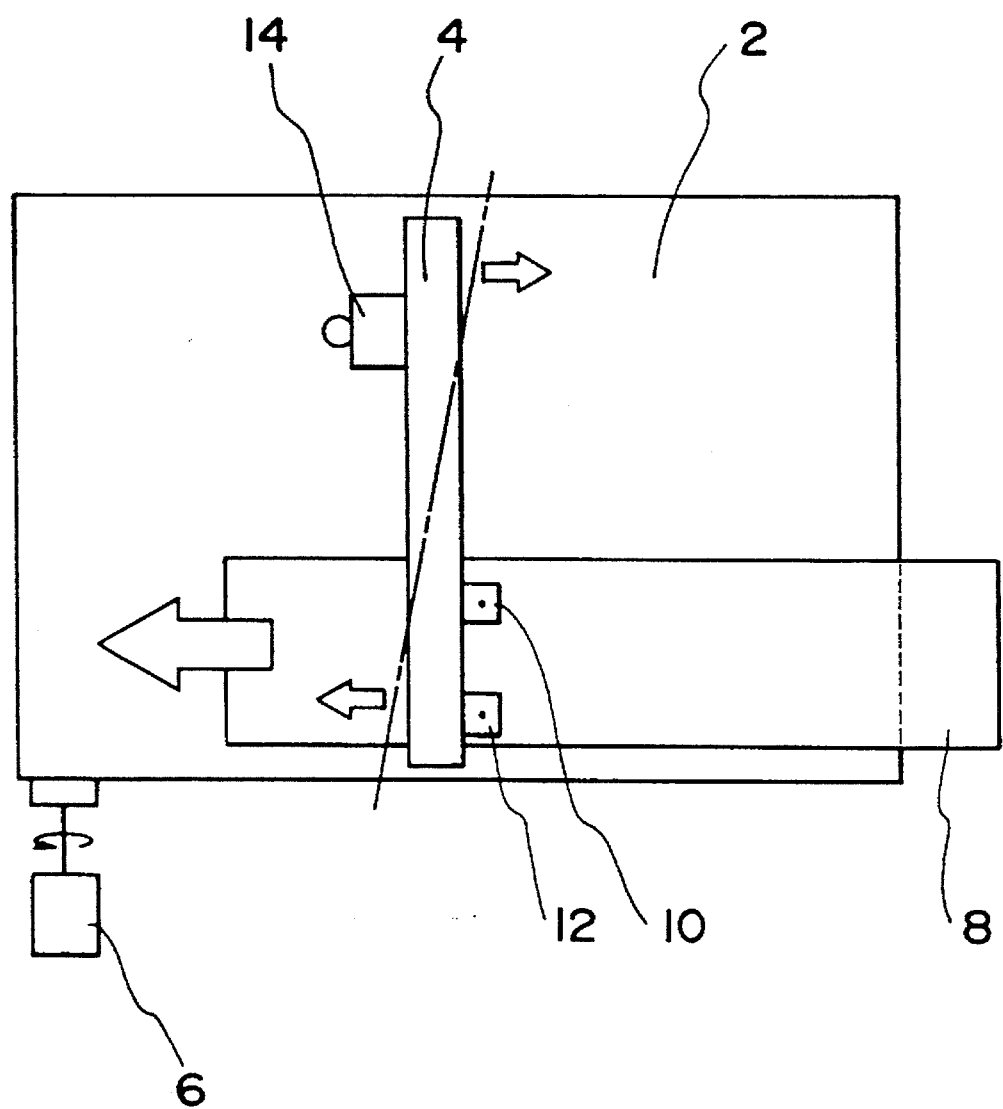
FIG. 4 is a plan view of a conventional plotter.

When the drawing is completed on the sheet member 64, the drawing operation is shifted to a carrying operation of the sheet member for one drawing. The controller for controlling the transfer rail 22 and the head 48, has a built-in sheet-carrying program. When the sheet-carrying program of the controller starts (STEP 1) in FIG. 3, the controller moves the transfer rail 22 to an original point on an X-axis (STEP 2). Next, each solenoid 60 of the grips 52, 54, 56 and 58 for the belt and for the sheet are driven (STEP 3). With the drive, the pressure members 62 of the grips 56 and 58 apply pressure to the sheet member 64 and the belt 46, and the grips 56 and 58 hold the belt 46 and the sheet member 64. Also, the grips 52 and 54 hold the belt 46. The belt 46 and the sheet member 64 are engaged with the transfer rail 22 by means of the grips 56 and 58. Also, the belt 46 engages the transfer rail 22 by means of the grips 52 and 54. Next, the controller stops the energization of the rail drive motor 40 (STEP 4) and releases the excitation of the motor 40 allowing the output shaft of the motor 40 to rotate freely.

Next, the controller stops the suction operation of the vacuum table (STEP 5). The controller starts the belt drive motor 20, moves the belt 46 in a predetermined direction and begins movement of the sheet member 64. The controller decides whether or not to stop the process (STEP 7) and when the decision is made, stops the belt drive motor 20, and stops the movement of the sheet member 64 (STEP 8). Next, the controller releases the grips 52 and 54 for the belt (STEP 9) and pulls the pin of each grip 52 and 54 at both ends of the belt 46 causing the grips 52 and 54 to be non-engaged against the belt 46. Next, the controller decides whether or not it is in a local mode (STEP 10) and when the decision is made, whether or not it is in the remote mode (STEP 11). When the affirmative judgment is given in STEP 11, the grips 52 and 54 for the belt are operated (STEP 12) and the grips 52 and 54 are engaged at both ends of the belt 46 in the crosswise direction.

Next, the motor 20 is driven, and the movement of the sheet member 64 continues (STEP 13), and completes the movement of the sheet member 64 (STEP 14) when the movement of a predetermined amount is confirmed.

The grips 52, 54, 56 and 58 for the belt and for the sheet are released in STEP 15, and the transfer rail 22 is driven in an original point direction (STEP 16), and the operation is shifted to the next drawing process (STEP 17). When the grips 52 and 54 for the belt are released in STEP 9, a position adjustment between the belt 46 and the sheet member 64 becomes possible. This position adjustment can actually be carried out by shifting the transfer rail 22. In the case where the stop processing is not carried out, it shifts from STEP 7 to STEP 14. Also, when the local mode is recognized in STEP 10, suction occurs in the vacuum table (STEP 18), and the grips 52 and 54 are released from the belt 46 (STEP 19), while the controller stands by with the local mode (STEP 20).

What is claimed is:

1. A method of transferring a sheet in a plotter comprising a sheet support surface, a belt for moving the sheet support surface, and a transfer rail movable in a direction of movement of the sheet support surface, the transfer rail comprising two sets of grips, each being composed of a pair of grips whose distance apart from each other is adjustable according to the width of the sheet on the sheet support surface, the method comprising the steps of:

causing one of said sets of grips to grip the belt and the sheet;

causing the other of said sets of grips to grip only the belt; and driving the belt to move collectively the sheet, the sheet support surface, and the transfer rail by a predetermined amount in a predetermined direction.

2. A device for carrying a sheet member in a plotter, comprising:

a sheet support surface;

an endless carrying belt for moving the sheet support surface;

a transfer rail, interlocking with a drive system, to move in a direction of movement of the sheet support surface, said transfer rail comprising:

a drawing head, shiftable along the transfer rail;

a pair of grips for gripping the carrying belt; and a second pair of grips for gripping the sheet together with the belt; and a controller which controls the grips, movement of the carrying belt, the transfer rail drive system, and the drawing head.

* * * * *